Jan. 24, 1956 H. M. BROWN 2,731,907
COMBINATION COFFEE AND TEA MAKER
Filed Jan. 23, 1953

INVENTOR
Harold M. Brown
BY
Edward C. Healy
ATTORNEY

United States Patent Office 2,731,907
Patented Jan. 24, 1956

2,731,907
COMBINATION COFFEE AND TEA MAKER
Harold M. Brown, Redwood City, Calif.
Application January 23, 1953, Serial No. 332,836
1 Claim. (Cl. 99—316)

This invention relates to improvements in cooking utensils and has particlular reference to a combination coffee and tea maker.

The principal object of the invention is the provision of a container wherein the structure thereof, without interchanging the parts, may be readily utilized to efficiently make either coffee or tea, as desired.

A further object of the invention is the provision of a perforated plate that is slidably mounted in the container and is equipped with a vertical lip that will prevent the coffee grounds or tea leaves from mixing with the prepared coffee or tea.

An additional object of the invention is the provision of a slidable lid in the container that, when in an open position, will permit the coffee or tea products and the water to be deposited in the container and when closed will prevent the spilling of the fluid during the pouring operation.

A further object of the invention is the provision of a container of the character described that is simple in construction, economical to manufacture, strong, durable and highly efficient and serviceable in use.

Other objects and advantages will be apparent during the course of the following description.

Figure 1:
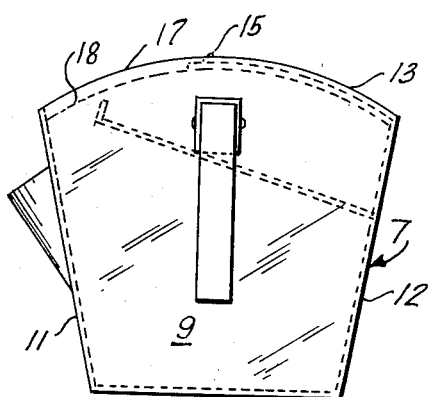
Figure 2:
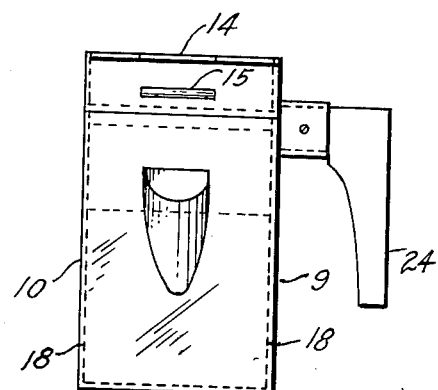
Figure 3:
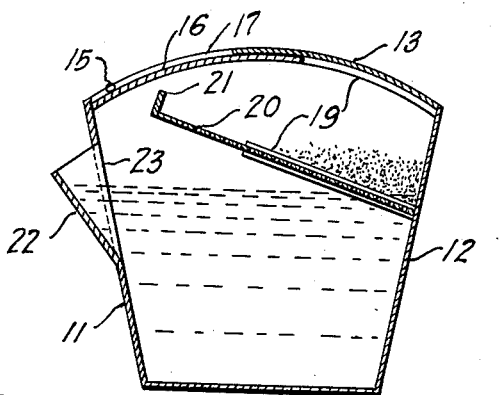
Figure 4:
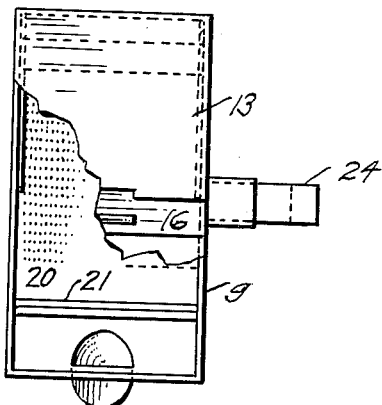
Figure 6:
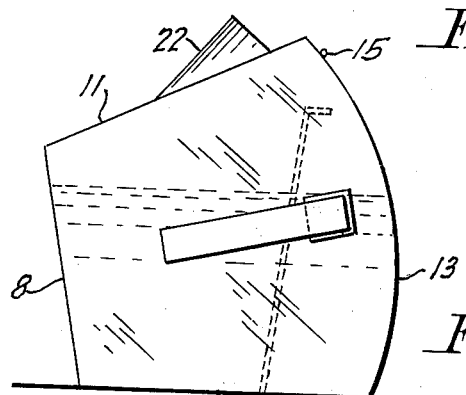
Figure 5:
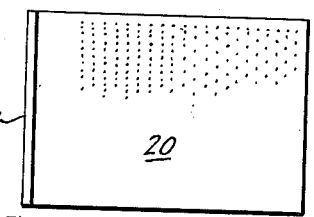

In the accompanying drawing forming a part of this specification and in which like numerals are employed to designate like parts throughout the same, Fig. 1 is a side elevational view of the invention, Fig. 2 is a front elevational view of the same, Fig. 3 is a cross sectional view, Fig. 4 is a top plan view with a portion of the structure removed, Fig. 5 is a top plan view of the perforated plate or screen of the device, and Fig. 6 is a plan view of the container showing the same as resting on its rear wall when the coffee is being prepared.

In the accompanying drawing wherein for the purpose of illustration is shown a preferred embodimnt of my invention, the numeral 7 designated the container as a whole, that embodies in its construction a flat base 8, side walls 9 and 10 that taper upwardly from said base, and are curved at their upper extremities, an inclined front wall 11 and an inclined rear wall 12. A sectional top wall 13 is secured on the top of said rear front and side walls and said top wall is centrally recessed as at 14 along its near marginal edge for the reception therein of a rib 15 that defines a finger hold for manipulating a curved lid 16, that is in turn slidably positioned beneath the top wall 13. This lid is adapted to cover and uncover an enlarged top opening 17 that is provided to permit the filling of the container with water and the coffee and tea products.

Vertical reenforcing side plates 18, of the general configuration of the side walls but of lesser height, abut the inner surfaces of the side walls and serve to support the lid. Horizontal shoulders 19 formed internally on said plates serve as a supporting means for a loosely mounted partly perforated plate 20. It will be noted that said plate is equipped with a vertical lip 21 that functions to prevent the passage of coffee grounds or tea leaves into the boiled coffee or tea in the container.

After the sliding lid has uncovered the opening, and in preparing coffee, the desired amount of ground coffee or the like is first inserted through the opening 17 and placed on the perforated plate 20. The desired amount of water is then poured into the container below the plate 20. The lid is then closed and the container is positioned over the heating medium, for instance the flame from a stove. In the making of coffee the rear wall 12 now functions as a base for the container which container is manually turned so that the flame will directly contact the rear wall. By virtue of this arrangement the water will circulate, due to the perforations in the plate, and will readily contact the ground coffee during the boiling action of the water. The container is then placed in its normal upright position and the coffee is ready to be poured through the spout 22 formed on the front wall 11. It is to be noted that said spout is in communication with the interior of the container due to the provision of an opening 23 provided in the front wall directly behind the spout.

On the side wall I have provided a handle 24 for conveniently manipulating the container. The said container is preferably made of transparent material of a nature that will not be damaged by heat during the boiling operation. Due to the transparent nature of the container, the interior of the same is readily visible during the tea and coffee making operations.

In the making of tea, the tea leaves are deposited on the perforated plate by inserting the leaves through the opening 17. Water is then poured into the container and the latter is closed and placed over the fire, as in Fig. 1, until boiling action occurs. After the boiling action the container is manipulated to assume the position of Fig. 6 of the drawing, where container remains for a pre-determined period of time to allow the desired steeping action. When the container is then turned to assume the position of Fig. 1, the prepared tea is poured from the spout 22. It is obvious that the container will be thoroughly scoured and cleaned after each tea and coffee making operation.

It is understood that the form of my invention herewith shown and described is to be taken as a preferred example of the same and that various changes relative to the shape, size, material and arrangement of parts may readily be resorted to without departing from the spirit of the invention or the scope of the subjoined claims.

Having thus described my invention, I claim:

A device of the character described comprising a container having a top opening therein, a slidable lid for said container for covering and uncovering the top opening, and an inclined perforated plate mounted within said container and below said lid for receiving thereon the coffee and tea making ingredients, vertical reinforcing side plates of the general configuration of the side walls but of lesser height and abutting the side walls and to support said lid, one end of said plate being equipped with an upwardly extending lip to prevent displacement of the coffee and tea making ingredients, and shoulders internally provided on said plates to support said perforated plate.

References Cited in the file of this patent

UNITED STATES PATENTS

| 508,828 | Mann | Nov. 14, 1893 |
| 678,720 | Mackinnon et al. | July 16, 1901 |

FOREIGN PATENTS

| 7,474 | Great Britain | 1893 |
| 10,944 | Great Britain | 1900 |
| 17,386 | Great Britain | 1891 |
| 18,278 | Great Britain | 1905 |